(12) United States Patent
Drego et al.

(10) Patent No.: US 10,761,848 B1
(45) Date of Patent: Sep. 1, 2020

(54) SYSTEMS AND METHODS FOR IMPLEMENTING CORE LEVEL PREDICATION WITHIN A MACHINE PERCEPTION AND DENSE ALGORITHM INTEGRATED CIRCUIT

(71) Applicant: quadric.io, Inc., Burlingame, CA (US)

(72) Inventors: Nigel Drego, San Carlos, CA (US);
Ananth Durbha, San Carlos, CA (US);
Aman Sikka, San Carlos, CA (US);
Mrinalini Ravichandran, San Carlos, CA (US); Daniel Firu, San Carlos, CA (US); Veerbhan Kheterpal, San Carlos, CA (US)

(73) Assignee: quadric.io, Inc., Burlingame, CA (US)

( * ) Notice: Subject to any disclaimer, the term of this patent is extended or adjusted under 35 U.S.C. 154(b) by 0 days.

(21) Appl. No.: 16/793,166

(22) Filed: Feb. 18, 2020

Related U.S. Application Data

(60) Provisional application No. 62/807,588, filed on Feb. 19, 2019.

(51) Int. Cl.
*G06F 15/82* (2006.01)
*G06F 9/30* (2018.01)
*G06F 9/38* (2018.01)

(52) U.S. Cl.
CPC ...... *G06F 9/30134* (2013.01); *G06F 9/30101* (2013.01); *G06F 9/3838* (2013.01)

(58) Field of Classification Search
None
See application file for complete search history.

(56) References Cited

U.S. PATENT DOCUMENTS

2006/0149921 A1* 7/2006 Lim ............ H04L 45/00
712/10

* cited by examiner

*Primary Examiner* — Cheng Yuan Tseng
(74) *Attorney, Agent, or Firm* — Padowithz Alce

(57) ABSTRACT

Systems and methods for implementing an integrated circuit with core-level predication includes: a plurality of processing cores of an integrated circuit, wherein each of the plurality of cores includes: a predicate stack defined by a plurality of single-bit registers that operate together based on one or more of logical connections and physical connections of the plurality of single-bit registers, wherein: the predicate stack of each of the plurality of processing cores includes a top of stack single-bit register of the plurality of single-bit registers having a bit entry value that controls whether select instructions to the given processing core of the plurality of processing cores is executed.

18 Claims, 6 Drawing Sheets

400

Configuring a Predicate Stack S410

Setting a Controlling Bit S420

Implementing a Predicate Stack S430

Implementing a Non-Nested Condition S432

Implementing a Nested Condition S434

Implementing Loop Instructions S436

Implementing Nested Loops S438

Implementing a Global Enablement S440

FIGURE 4

SYSTEMS AND METHODS FOR IMPLEMENTING CORE LEVEL PREDICATION WITHIN A MACHINE PERCEPTION AND DENSE ALGORITHM INTEGRATED CIRCUIT

CROSS-REFERENCE TO RELATED APPLICATIONS

This application claims the benefit of U.S. Provisional Application No. 62/807,588, filed 19 Feb. 2019, which is incorporated in its entirety by this reference.

TECHNICAL FIELD

The one or more inventions described herein relate generally to the integrated circuitry field, and more specifically to a new and useful perception and dense algorithm processing integrated circuitry architecture in the integrated circuitry field.

BACKGROUND

Modern applications of artificial intelligence and generally, machine learning appear to be driving innovations in robotics and specifically, in technologies involving autonomous robotics and autonomous vehicles. Also, the developments in machine perception technology have enabled the abilities of many of the implementations in the autonomous robotics' and autonomous vehicles' spaces to perceive vision, perceive hearing, and perceive touch among many other capabilities that allow machines to comprehend their environments.

The underlying perception technologies applied to these autonomous implementations include a number of advanced and capable sensors that often allow for a rich capture of environments surrounding the autonomous robots and/or autonomous vehicles. However, while many of these advanced and capable sensors may enable a robust capture of the physical environments of many autonomous implementations, the underlying processing circuitry that may function to process the various sensor signal data from the sensors often lack in corresponding robust processing capabilities sufficient to allow for high performance and real-time computing of the sensor signal data.

The underlying processing circuitry often include general purpose integrated circuits including central processing units (CPUs) and graphic processing units (GPU). In many applications, GPUs are implemented rather than CPUs because GPUs are capable of executing bulky or large amounts of computations relative to CPUs. However, the architectures of most GPUs are not optimized for handling many of the complex machine learning algorithms (e.g., neural network algorithms, etc.) used in machine perception technology. For instance, the autonomous vehicle space includes multiple perception processing needs that extend beyond merely recognizing vehicles and persons. Autonomous vehicles have been implemented with advanced sensor suites that provide a fusion of sensor data that enable route or path planning for autonomous vehicles. But, modern GPUs are not constructed for handling these additional high computation tasks.

At best, to enable a GPU or similar processing circuitry to handle additional sensor processing needs including path planning, sensor fusion, and the like, additional and/or disparate circuitry may be assembled to a traditional GPU. This fragmented and piecemeal approach to handling the additional perception processing needs of robotics and autonomous machines results in a number of inefficiencies in performing computations including inefficiencies in sensor signal processing.

Accordingly, there is a need in the integrated circuitry field for an advanced integrated circuit that is capable of high performance and real-time processing and computing of routine and advanced sensor signals for enabling perception of robotics or any type or kind of perceptual machine.

The inventors of the inventions described in the present application have designed an integrated circuit architecture that allows for enhanced sensor data processing capabilities and have further discovered related methods for implementing the integrated circuit architecture for several purposes including for enabling perception of robotics and various machines.

SUMMARY OF THE INVENTION(S)

In one embodiment, a system for implementing an integrated circuit with core-level predication includes a plurality of processing cores of an integrated circuit, wherein each of the plurality of cores includes: a predicate stack defined by a plurality of single-bit registers that operate together based on one or more of logical connections and physical connections of the plurality of single-bit registers, wherein: the predicate stack of each of the plurality of processing cores includes a top of stack single-bit register of the plurality of single-bit registers having a bit entry value that controls whether select instructions to the given processing core of the plurality of processing cores are executed.

In one embodiment, instructions push a result of a conditional clause onto the predicate stack of the given processing core of the plurality of processing cores; if the conditional clause evaluates to TRUE, based on a comparison of distinct values of the conditional clause, the given processing core executes an instruction of the conditional clause.

In one embodiment, instructions push a result of a conditional clause onto the predicate stack of the given processing core of the plurality of processing cores; if the conditional clause evaluates to FALSE, based on a comparison of distinct values of the conditional clause, the given processing core bypasses an instruction of the conditional clause and selectively executes or not a distinct instruction clause.

In one embodiment, each of the plurality of single-bit registers of the predicate stack is initialized to a value of 1 according to 1/0 binary system; if the conditional clause evaluates to FALSE, based on a comparison of distinct values of the conditional clause, a bit entry value of 0 is pushed to a top of the predicate stack.

In one embodiment, the given processing core selects to execute instructions of a predicated ELSE clause over instructions of an IF clause of the conditional clause based on the bit entry value of the top of the predicate stack being pushed to 0.

In one embodiment, if the conditional clause evaluates to FALSE, based on a comparison of distinct values of data of the conditional clause: (i) a bit entry value of a top of the predicate stack of a given processing core of the plurality of processing cores is pushed to 0; and (ii) the given processing core selects to execute instructions of an alternative instruction over instructions of an IF clause of the conditional clause, wherein an execution of the alternative instructions flips the bit entry value of the top of the predicate stack from 0 to 1.

In one embodiment, in response to executing or not executing the select instructions at the given processing core, executing by the given processing core a predicated pop instruction that pops the bit entry value from the top of the predicate stack and exposes a bit entry value of a bit entry that was previously below the top of stack.

In one embodiment, instructions pushing a result of a conditional clause onto the predicate stack of the given processing core include a nested conditional clause; a counter of the given processing core tracks a depth of the nested conditional clause within a body of the instructions; and instructions affecting a predicate stack of the nested conditional clause include a value of the counter associated with the depth of the nested conditional clause.

In one embodiment, the given processing cores executes instructions of a loop body; a conditional loop break if evaluated to TRUE causes an execution of a disable instruction that stops an execution of the instructions of the loop body by the given processing core and that disables the given processing core.

In one embodiment, the execution of the disable instruction changes a bit entry value of an enable bit of the given processing core from 1 to 0 according to a 1/0 binary system; a subsequent execution of an enable instruction paired with the disable instruction causes a re-enablement of the given processing core and changes the bit entry value of the enable bit from 0 to 1.

In one embodiment, the given processing core executes instructions of a nested loop body; a counter of the given processing core tracks a depth of the nested loop body; and instructions affecting the nested loop body include a value of the counter associated with the depth of the nested loop body.

In one embodiment, a conditional loop break having the value of the counter tracking the depth of nested loop body, if evaluated to TRUE causes an execution of a disable instruction that stops an execution of the instructions of the nested loop body by the given processing core and that disables the given processing core.

In one embodiment, a subsequent execution of an enable instruction having the value of the counter tracking the depth of nested loop body paired with the disable instruction causes a re-enablement of the given processing core.

In one embodiment, the given processing cores executes instructions of a loop body; a conditional loop continue if evaluated to TRUE causes an execution of an idling instruction that pauses an execution of a remainder of instructions of a current iteration of the loop body by the given processing core and that idles the given processing core.

In one embodiment, executing an enable instruction at an end of instructions within the loop body; at a subsequent iteration of the loop body, re-enabling the given processing core based on the execution of the enable instruction and executing instructions of the subsequent iteration of the loop body.

In one embodiment, if it is determined that a subset or all the plurality of processing cores are in a disabled state, a dispatcher forces a skip to an end of instructions at the subset or all the plurality of processing cores and executes an enable instruction that changes a value of an enable bit from 0 to 1 to enable the subset or all the plurality of processing cores.

In one embodiment, a method for implementing an integrated circuit with core-level predication includes implementing a plurality of processing cores of an integrated circuit, wherein each of the plurality of cores includes: a predicate stack defined by a plurality of single-bit registers that operate together based on one or more of logical connections and physical connections of the plurality of single-bit registers, wherein: the predicate stack of each of the plurality of processing cores includes a top of stack single-bit register of the plurality of single-bit registers having a bit entry value that controls whether select instructions to the given processing core of the plurality of processing cores are executed.

In one embodiment, the method includes pushing a result of a conditional clause onto the predicate stack of the given processing core of the plurality of processing cores; if the conditional clause evaluates to TRUE, based on a comparison of distinct values of the conditional clause, executing by the given processing core an instruction of the conditional clause.

In one embodiment, the method includes pushing a result of a conditional clause onto the predicate stack of the given processing core of the plurality of processing cores; if the conditional clause evaluates to FALSE, based on a comparison of distinct values of the conditional clause, bypassing by the given processing core an instruction of the conditional clause and selectively executing or not a distinct instruction clause.

In one embodiment, the method includes initializing each of the plurality of single-bit registers of the predicate stack to a value of 1 according to 1/0 binary system; if the conditional clause evaluates to FALSE, based on a comparison of distinct values of the conditional clause, pushing a bit entry value of 0 onto of a top of the predicate stack of the given processing core of the plurality of processing cores.

BRIEF DESCRIPTION OF THE FIGURES

FIG. 4 illustrates a method 400 for implementing a predicate stack in accordance with one or more embodiments of the present application.

DESCRIPTION OF THE PREFERRED EMBODIMENTS

The following description of preferred embodiments of the present application are not intended to limit the inventions to these preferred embodiments, but rather to enable any person skilled in the art of to make and use these inventions.

I. Overview

As discussed above in the background section, the state of the art in integrated circuit architecture lacks a suitable solution for handling the multitude of perception processing tasks of robotics and autonomous machines. While GPUs may be modified with additional and/or disparate circuitry to perform some of these perception processing requirements of robotics and autonomous machines, significant gaps in a GPU's processing capabilities exist such that the resulting performance is low and not in real-time. Other perception processing circuits may exist including neural network-specific processors, computer-vision-specific processors, and the like; however, none of these provide a single comprehensive integrated circuit that is capable of processing the many disparate perception algorithms and computations needed for sensor acquisition, sensor fusion, perception processing, path planning, and the like.

Accordingly, one or more embodiments of the present application function to provide a comprehensive optimized compute platform for processing perception algorithms, perception data (e.g., sensor data and the like), and various perception processing requirements of robotics and autonomous machines. In preferred embodiments, the optimized compute platform may be implemented as a high performance and real-time processing dense algorithm processing unit (DAPU) and/or perception processing unit (PPU). In one or more implementations, the integrated circuit disclosed in the various embodiments of the present application includes an array core having a plurality of disparate processing elements and data flow and storage elements that operate to form a mesh architecture enabling the movement of data among and between many combinations of processing elements within the array core.

The mesh architecture defined by the plurality of processing elements in the array core preferably enable in-memory computing and data movement, as described in U.S. Pat. No. 10,365,860, U.S. patent application Ser. No. 16/292,537, U.S. Provisional Application Nos. 62/649,551 and 62/649,551, which are all incorporated herein in their entireties by this reference and further, enable a core-level predication.

II. A System Architecture of a Dense Algorithm and/or Perception Processing Circuit (Unit)

Figure 1:
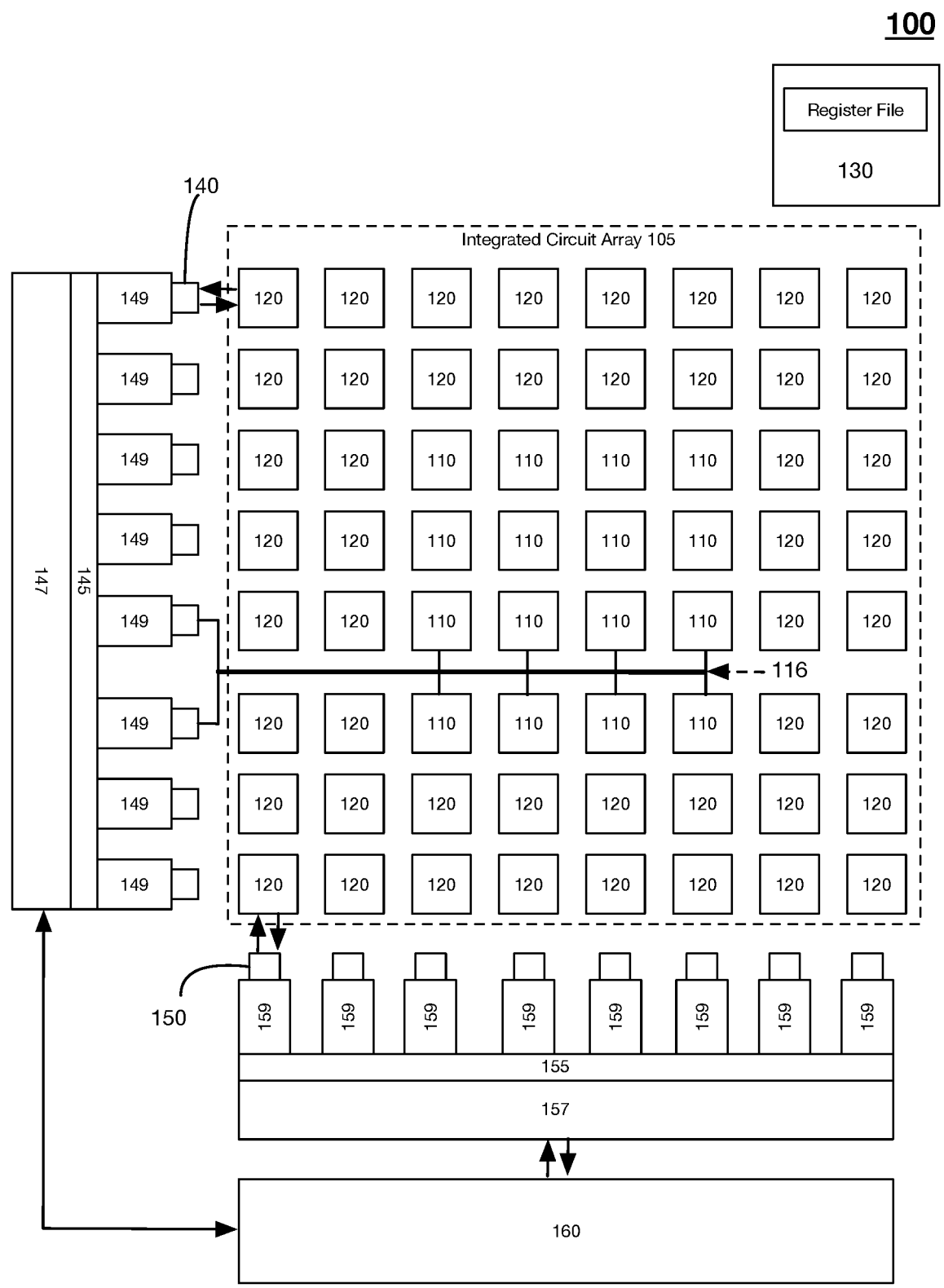
FIG. 1 illustrates a schematic of a system 100 in accordance with one or more embodiments of the present application.

As shown in FIG. 1, the integrated circuit 100 (dense algorithm and/or perception processing unit) for performing perception processing includes a plurality of array cores 110, a plurality of border cores 120, a dispatcher (main controller) 130, a first plurality of periphery controllers 140, a second plurality of periphery controllers 150, and main memory 160. The integrated circuit 100 may additionally include a first periphery load store 145, a second periphery load store 155, a first periphery memory 147, a second periphery memory 157, a first plurality of dual FIFOs 149, and a second plurality of dual FIFOs 159.

The integrated circuit 100 preferably functions to enable real-time and high computing efficiency of perception data and/or sensor data. A general configuration of the integrated circuit 100 includes a plurality of array core 110 defining central signal and data processing nodes each having large register files that may eliminate or significantly reduce clock cycles needed by an array core 110 for pulling and pushing data for processing from memory. The instructions (i.e., computation/execution and data movement instructions) generating capabilities of the integrated circuit 100 (e.g., via the dispatcher 130 and/or a compiler module 175) functions to enable a continuity and flow of data throughout the integrated circuit 100 and namely, within the plurality of array cores 110 and border cores 120.

An array core 110 preferably functions as a data or signal processing node (e.g., a small microprocessor) or processing circuit and preferably, includes a register file 112 having a large data storage capacity (e.g., 1024 kb, etc.) and an arithmetic logic unit (ALU) 118 or any suitable digital electronic circuit that performs arithmetic and bitwise operations on integer binary numbers. In a preferred embodiment, the register file 112 of an array core 110 may be the only memory element that the processing circuits of an array core 110 may have direct access to. An array core 110 may have indirect access to memory outside of the array core and/or the integrated circuit array 105 (i.e., core mesh) defined by the plurality of border cores 120 and the plurality of array cores 110.

The register file 112 of an array core 110 may be any suitable memory element or device, but preferably comprises one or more static random-access memories (SRAMs). The register file 112 may include a large number of registers, such as 1024 registers, that enables the storage of a sufficiently large data set for processing by the array core 110. Accordingly, a technical benefit achieved by an arrangement of the large register file 112 within each array core 110 is that the large register file 112 reduces a need by an array core 110 to fetch and load data into its register file 112 for processing. As a result, a number of clock cycles required by the array core 112 to push data into and pull data out of memory is significantly reduced or eliminated altogether. That is, the large register file 112 increases the efficiencies of computations performed by an array core 110 because most, if not all, of the data that the array core 110 is scheduled to process is located immediately next to the processing circuitry (e.g., one or more MACs, ALU, etc.) of the array core 110. For instance, when implementing image processing by the integrated circuit 100 or related system using a neural network algorithm(s) or application(s) (e.g., convolutional neural network algorithms or the like), the large register file 112 of an array core may function to enable a storage of all the image data required for processing an entire image. Accordingly, most or if not, all layer data of a neural network implementation (or similar compute-intensive application) may be stored locally in the large register file 112 of an array core 110 with the exception of weights or coefficients of the neural network algorithm(s), in some embodiments. Accordingly, this allows for optimal utilization of the computing and/or processing elements (e.g., the one or more MACs and ALU) of an array core 110 by enabling an array core 110 to constantly churn data of the register file 112 and further, limiting the fetching and loading of data from an off-array core data source (e.g., main memory, periphery memory, etc.).

By comparison, to traverse a register file in a traditional system implemented by a GPU or the like, it is typically required that memory addresses be issued for fetching data from memory. However, in a preferred embodiment that implements the large register file 112, the (raw) input data within the register file 112 may be automatically incremented from the register file 112 and data from neighboring core(s) (e.g., array cores and/or border cores) are continuously sourced to the register file 112 to enable a continuous flow to the computing elements of the array core 110 without an express need to make a request (or issuing memory addresses) by the array core 110.

While in some embodiments of the present application, a predetermined data flow scheduled may mitigate or altogether, eliminate requests for data by components within the integrated circuit array 105, in a variant of these embodiments traditional random memory access may be achieved by components of the integrated circuit array 105. That is, if an array core 110 or a border core 120 recognizes a need for a random piece of data for processing, the array core 110 and/or the border 120 may make a specific request for data from any of the memory elements within the memory hierarchy of the integrated circuit 100.

Figure 2:
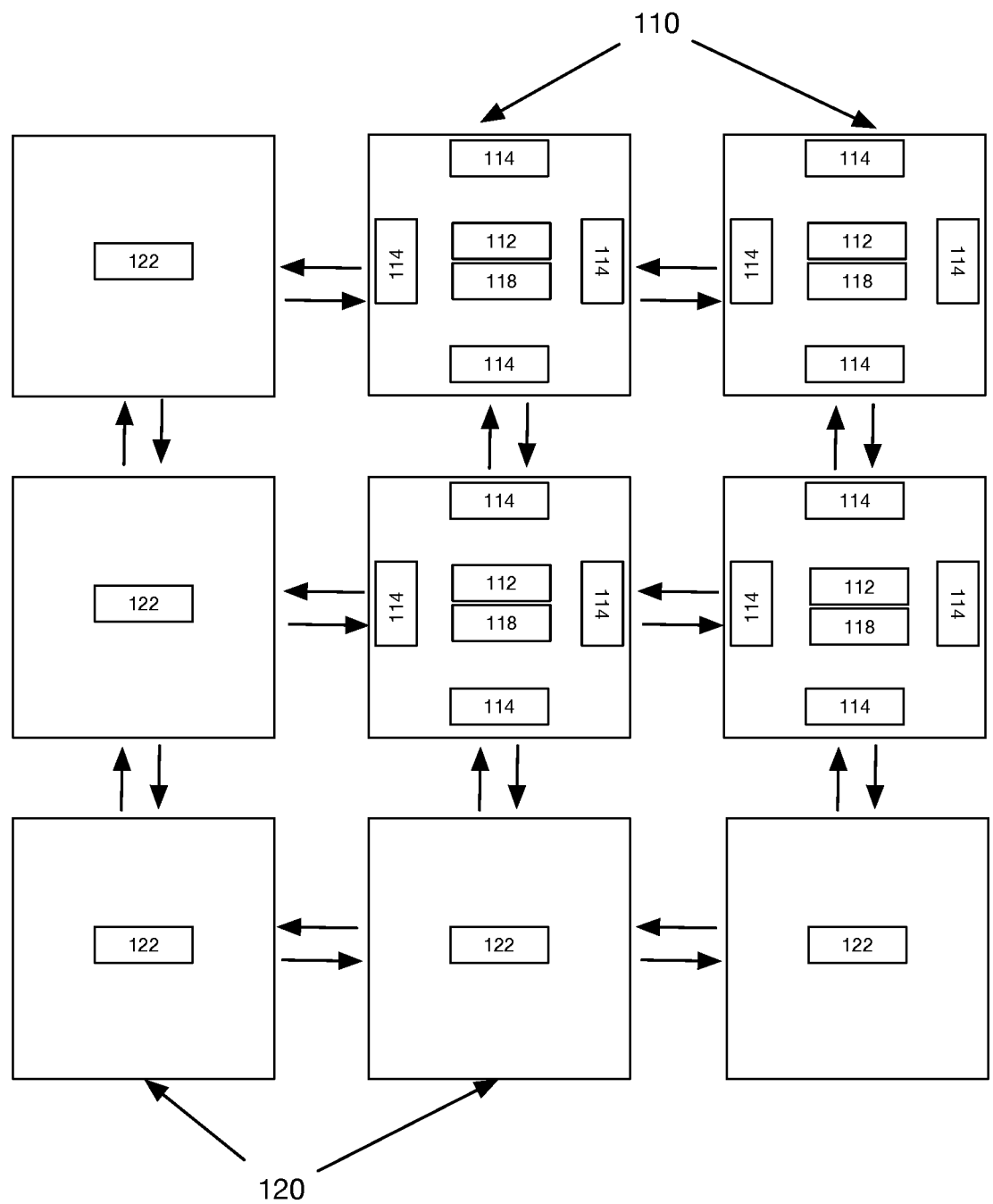
FIG. 2 illustrates a detailed schematic of a segment of the integrated circuit array 105 in accordance with one or more embodiments of the present application.

An array core 110 may, additionally or alternatively, include a plurality of multiplier (multiply) accumulators (MACs) 114 or any suitable logic devices or digital circuits that may be capable of performing multiply and summation functions. In a preferred embodiment, each array core 110 includes four (4) MACs and each MAC 114 may be arranged at or near a specific side of a rectangular shaped array core 110, as shown by way of example in FIG. 2. While, in a preferred embodiment each of the plurality of MACs 114 of an array core 110 may be arranged near or at the respective sides of the array core 110, it shall be known that the plurality of MACs 114 may be arranged within (or possibly augmented to a periphery of an array core) the array core 110 in any suitable arrangement, pattern, position, and the like including at the respective corners of an array core 110. In a preferred embodiment, the arrangement of the plurality of MACs 114 along the sides of an array core 110 enables efficient inflow or capture of input data received from one or more of the direct neighboring cores (i.e., an adjacent neighboring core) and the computation thereof by the array core 110 of the integrated circuit 100.

Accordingly, each of the plurality of MACs 114 positioned within an array core 110 may function to have direct communication capabilities with neighboring cores (e.g., array cores, border cores, etc.) within the integrated circuit 100. The plurality of MACs 114 may additionally function to execute computations using data (e.g., operands) sourced from the large register file 112 of an array core 110. However, the plurality of MACs 114 preferably function to source data for executing computations from one or more of their respective neighboring core(s) and/or a weights or coefficients (constants) bus 116 that functions to transfer coefficient or weight inputs of one or more algorithms (including machine learning algorithms) from one or more memory elements (e.g., main memory 160 or the like) or one or more input sources.

The weights bus 116 may be operably placed in electrical communication with at least one or more of periphery controllers 140, 150 at a first input terminal and additionally, operably connected with one or more of the plurality of array core 110. In this way, the weight bus 116 may function to collect weights and coefficients data input from the one or more periphery controllers 140, 150 and transmit the weights and coefficients data input directly to one or more of the plurality of array cores 110. Accordingly, in some embodiments, multiple array cores 110 may be fed weights and/or coefficients data input via the weights bus 116 in parallel to thereby improve the speed of computation of the array cores 110.

Each array core 110 preferably functions to bi-directionally communicate with its direct neighbors. That is, in some embodiments, a respective array core 110 may be configured as a processing node having a rectangular shape and arranged such that each side of the processing node may be capable of interacting with another node (e.g., another processing node, a data storage/movement node, etc.) that is positioned next to one of the four sides or each of the faces of the array core 110. The ability of an array core 110 to bi-directionally communicate with a neighboring core along each of its sides enables the array core 110 to pull in data from any of its neighbors as well as push (processed or raw) data to any of its neighbors. This enables a mesh communication architecture that allows for efficient movement of data throughout the collection of array and border cores 110, 120 of the integrated circuit 100.

Each of the plurality of border cores 120 preferably includes a register file 122. The register file 122 may be configured similar to the register file 112 of an array core 110 in that the register file 122 may function to store large datasets. Preferably, each border core 120 includes a simplified architecture when compared to an array core 110. Accordingly, a border core 120 in some embodiments may not include execution capabilities and therefore, may not include multiplier-accumulators and/or an arithmetic logic unit as provided in many of the array cores 110.

In a traditional integrated circuit (e.g., a GPU or the like), when input image data (or any other suitable sensor data) received for processing compute-intensive application (e.g., neural network algorithm) within such a circuit, it may be necessary to issue padding requests to areas within the circuit which do not include image values (e.g., pixel values) based on the input image data. That is, during image processing or the like, the traditional integrated circuit may function to perform image processing from a memory element that does not contain any image data value. In such instances, the traditional integrated circuit may function to request that a padding value, such as zero, be added to the memory element to avoid subsequent image processing efforts at the memory element without an image data value. A consequence of this typical image data processing by the traditional integrated circuit results in a number of clock cycles spent identifying the blank memory element and adding a computable value to the memory element for image processing or the like by the traditional integrated circuit.

In a preferred implementation of the integrated circuit 100, one or more of the plurality of border cores 120 may function to automatically set to a default value when no input data (e.g., input sensor data) is received. For instance, input image data from a sensor (or another circuit layer) may have a total image data size that does not occupy all border core cells of the integrated circuit array 105. In such instance, upon receipt of the input image data, the one or more border cores 120 (i.e., border core cells) without input image data may be automatically set to a default value, such as zero or a non-zero constant value.

In some embodiments, the predetermined input data flow schedule generated by the dispatcher and sent to one or more of the plurality of border cores may include instructions to set to a default or a predetermined constant value. Additionally, or alternatively, the one or more border cores 120 may be automatically set to a default or a predetermined value when it is detected that no input sensor data or the like is received with a predetermined input data flow to the integrated circuit array 105. Additionally, or alternatively, in one variation, the one or more border cores 120 may be automatically set to reflect values of one or more other border cores having input sensor data when it is detected that no input sensor data or the like is received with a predetermined input data flow to the integrated circuit array 105.

Accordingly, a technical benefit achieved according to the implementation of one or more of the plurality of border cores 120 as automatic padding elements, may include increasing efficiencies in computation by one or more of the plurality of array cores 110 by minimizing work requests to regions of interest (or surrounding areas) of input sensor data where automatic padding values have been set. Thereby, reducing clock cycles used by the plurality of array core 110 in performing computations on an input dataset.

In a preferred implementation of the integrated circuit 100, the progression of data into the plurality of array cores 110 and the plurality of border cores 120 for processing is preferably based on a predetermined data flow schedule generated at the dispatcher 130. The predetermined data flow schedule enables input data from one or more sources (e.g., sensors, other NN layers, an upstream device, etc.) to be loaded into the border cores 120 and array cores 110 without requiring an explicit request for the input data from the border cores 120 and/or array cores 110. That is, the predetermined data flow schedule enables an automatic flow of raw data from memory elements (e.g., main memory 160) of the integrated circuit 100 to the plurality of border cores 120 and the plurality of array cores 110 having capacity to accept data for processing. For instance, in the case that an array core 110 functions to process a first subset of data of a data load stored in its register file 112, once the results of the processing of the first subset of data is completed and sent out from the array core 110, the predetermined data flow schedule may function to enable an automatic flow of raw data into the array core 110 that adds to the data load at the register file 112 and replaces the first subset of data that was previously processed by the array core 110. Accordingly, in such instance, no explicit request for additional raw data for processing is required from the array core 110. Rather, the integrated circuit 100 implementing the dispatcher 130 may function to recognize that once the array core 110 has processed some amount of data sourced from its register file 112 (or elsewhere) that the array core 110 may have additional capacity to accept additional data for processing.

Figure 3A:
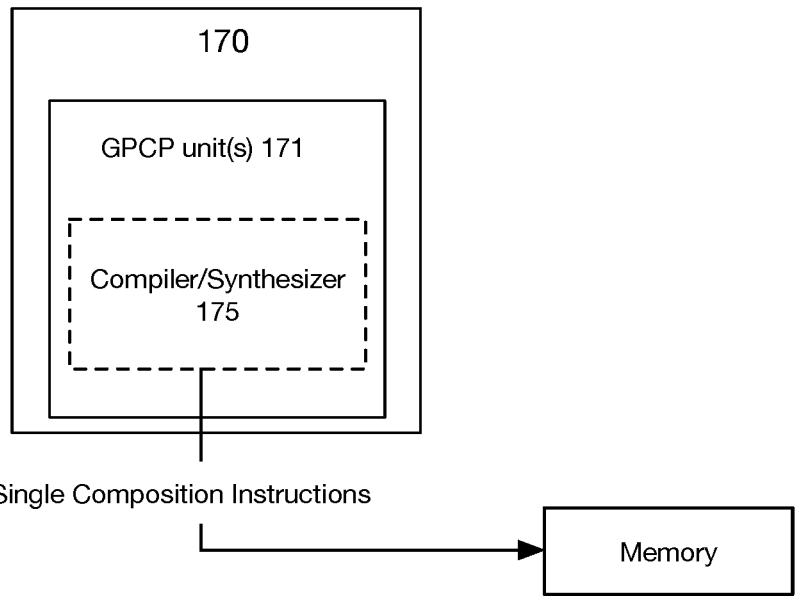
FIG. 3A illustrates a schematic of an instructions generator in accordance with one or more embodiments of the present application.

In a preferred embodiment, the integrated circuit 100 may be in operable communication with an instructions generator 170 that functions to generate computation, execution, and data movement instructions, as shown by way of example in FIG. 3A. The instructions generator 170 may be arranged off-chip relative to the components and circuitry of the integrated 100. However, in alternative embodiments, the instructions generator 170 may be cooperatively integrated within the integrated circuit 100 as a distinct or integrated component of the dispatcher 130.

Preferably, the instructions generator 170 may be implemented using one or more general purpose computers (e.g., a Mac computer, Linux computer, or any suitable hardware computer) or general purpose computer processing (GPCP) units 171 that function to operate a compiler module 175 that is specifically configured to generate multiple and/or disparate types of instructions. The compiler module 175 may be implemented using any suitable compiler software (e.g., a GNU Compiler Collection (GCC), a Clang compiler, and/or any suitable open source compiler or other compiler). The compiler module 175 may function to generate at least computation instructions and execution instructions as well as data movement instructions. In a preferred embodiment, at compile time, the compiler module 175 may be executed by the one or more GPCP units 171 to generate the two or more sets of instructions computation/execution instructions and data movement instructions sequentially or in parallel. In some embodiments, the compiler module 175 may function to synthesize multiple sets of disparate instructions into a single composition instruction set that may be loaded into memory (e.g., instructions buffer, an external DDR, SPI flash memory, or the like) from which the dispatcher may fetch the single composition instruction set from and execute.

In a first variation, however, once the compiler module 175 generates the multiple disparate sets of instructions, such as computation instructions and data movement instructions, the instructions generator 170 may function to load the instructions sets into a memory (e.g., memory 160 or off-chip memory associated with the generator 170). In such embodiments, the dispatcher 130 may function to fetch the multiple sets of disparate instructions generated by the instructions generator 170 from memory and synthesize the multiple sets of disparate instructions into a single composition instruction set that the dispatcher may execute and/or load within the integrated circuit 100.

In a second variation, the dispatcher 130 may be configured with compiling functionality to generate the single composition instruction set. In such variation, the dispatcher 130 may include processing circuitry (e.g., microprocessor or the like) that function to create instructions that include scheduled computations or executions to be performed by various circuits and/or components (e.g., array core computations) of the integrated circuit 100 and further, create instructions that enable a control a flow of input data through the integrated circuit 100. In some embodiments, the dispatcher 130 may function to execute part of the instructions and load another part of the instructions into the integrated circuit array 105. In general, the dispatcher 130 may function as a primary controller of the integrated circuit 100 that controls and manages access to a flow (movement) of data from memory to the one or more other storage and/or processing circuits of the integrated circuit 100 (and vice versa). Additionally, the dispatcher 130 may schedule control execution operations of the various sub-controllers (e.g., periphery controllers, etc.) and the plurality of array cores 110.

Figure 3B:
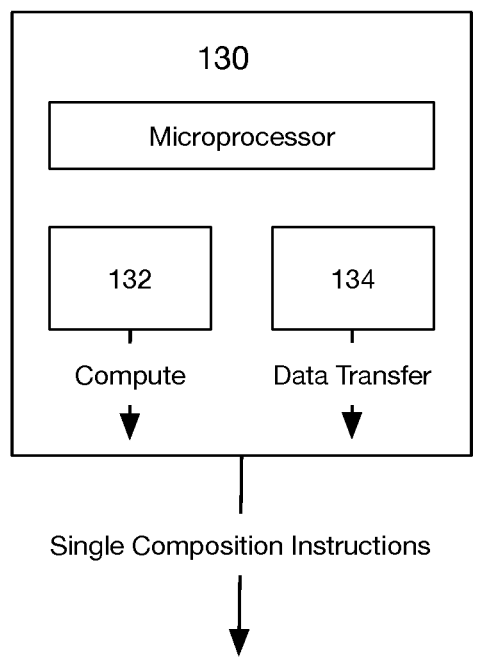
FIG. 3B illustrates a schematic of an integrated circuit controller in accordance with one or more embodiments of the present application.

As shown by way of example in FIG. 3B, in some embodiments, the processing circuitry of the dispatcher 130 includes disparate circuitry including a compute instruction generator circuit 132 and a data movement instructions generator circuit 134 (e.g., address generation unit or address computation unit) that may independently generate computation/execution instructions and data transfers/movements schedules or instructions, respectively. Accordingly, this configuration enables the dispatcher 130 to perform data address calculation and generation of computation/execution instructions in parallel. The dispatcher 130 may function to synthesize the output from both the computer instructions generator circuit 132 and the data movement instructions generator circuit 134 into a single instructions composition that combines the disparate outputs.

The single instructions composition generated by the instructions generator 170 and/or the dispatcher 130 may be provided to the one or more downstream components and integrated circuit array 105 and allow for computation or processing instructions and data transfer/movement instructions to be performed simultaneously by these various circuits or components of the integrated circuit 100. With respect to the integrated circuit array 105, the data movement component of the single instructions composition may be performed by one or more of periphery controllers 140, 150 and compute instructions by one or more of the plurality of array cores 110. Accordingly, in such embodiment, the periphery controllers 140, 150 may function to decode the data movement component of the instructions and if involved, may perform operations to read from or write to the dual FIFOs 149, 159 and move that data from the dual FIFOs 149, 159 onto a data bus to the integrated circuit (or vice versa). It shall be understood that the read or write operations performed by periphery controllers 140, 150 may performed sequentially or simultaneously (i.e., writing to and reading from dual FIFOs at the same time).

It shall be noted that while the compute instructions generator circuit 132 and the data movement instructions generator circuit 134 are preferably separate or independent circuits, in some embodiments the compute instructions generator circuit 132 and the data movement instructions generator circuit 134 may be implemented by a single circuit or a single module that functions to perform both compute instructions generation and data movement instruction generation.

In operation, the dispatcher 130 may function to generate and schedule memory addresses to be loaded into one or more the periphery load store 145 and the periphery load store 155. The periphery load stores 145, 155 preferably include specialized execution units that function to execute all load and store instructions from the dispatcher 130 and may generally function to load or fetch data from memory or storing the data back to memory from the integrated array core. The first periphery load store 145 preferably communicably and operably interfaces with both the first plurality of dual FIFOs 149 and the first periphery memory 147. The first and the second periphery memory 147, 157 preferably comprise on-chip static random-access memory.

In configuration, the first periphery load store 145 may be arranged between the first plurality of dual FIFOs 149 and the first periphery memory 147 such that the first periphery load store 145 is positioned immediately next to or behind the first plurality of dual FIFOs 149. Similarly, the second periphery load store 155 preferably communicably and operably interfaces with both the second plurality of dual FIFOs 159 and the second periphery memory 157. Accordingly, the second periphery load store 155 may be arranged between the second plurality of dual FIFOs 159 and the second periphery memory 157 such that the second periphery load store 155 is positioned immediately next to or behind the second plurality of dual FIFOs 159.

In response to memory addressing instructions issued by the dispatcher 130 to one or more of the first and the second periphery load stores 145, 155, the first and the second periphery load stores 145, 155 may function to execute the instructions to fetch data from one of the first periphery memory 147 and the second periphery memory 157 and move the fetched data into one or more of the first and second plurality of dual FIFOs 149, 159. Additionally, or alternatively, the dual FIFOs 149, 159 may function to read data from a data bus and move the read data to one or more of the respective dual FIFOs or read data from one or more of the dual FIFOs and move the read data to a data bus. Similarly, memory addressing instructions may cause one or more of the first and the second periphery load stores 145, 155 to move data collected from one or more of the plurality of dual FIFOs 149, 159 into one of the first and second periphery memory 147, 157.

Each of the first plurality of dual FIFOs 149 and each of the second plurality of dual FIFOs 159 preferably comprises at least two memory elements (not shown). Preferably, the first plurality of dual FIFOs 149 may be arranged along a first side of the integrated circuit array 105 with each of the first plurality of dual FIFOs 149 being aligned with a row of the integrated circuit array 105. Similarly, the second plurality of dual FIFOs 159 may be arranged along a second side of the integrated circuit array 105 with each of the second plurality of dual FIFOs 159 being aligned with a column of the integrated circuit array 105. This arrangement preferably enables each border 120 along the first side of the integrated circuit array 105 to communicably and operably interface with at least one of the first periphery controllers 145 and each border 120 along the second side of the integrated circuit array 105 to communicably and operably interface with at least one of the second periphery controllers 155.

While it is illustrated in at least FIG. 1 that there are a first and second plurality of dual FIFOs, first and second periphery controllers, first and second periphery memories, and first and second load stores, it shall be noted that these structures may be arranged to surround an entire periphery of the integrated circuit array 105 such that, for instance, these components are arranged along all (four) sides of the integrated circuit array 105.

The dual FIFOs 149, 159 preferably function to react to specific instructions for data from their respective side. That is, the dual FIFOs 149, 159 may be configured to identify data movement instructions from the dispatcher 130 that is specific to either the first plurality of dual FIFOs 149 along the first side or the second plurality of dual FIFOs along the second side of the integrated circuit array 105.

According to a first implementation, each of the dual FIFOs may use first of the two memory elements to push data into the integrated circuit array 105 and second of the two memory elements to pull data from the integrated circuit array 105. Thus, each dual FIFO 149, 159 may have a first memory element dedicated for moving data inward into the integrated circuit array 105 and a second memory element dedicated for moving data outward from the integrated circuit array 105.

According to a second implementation, the dual FIFOs may be operated in a stack (second) mode in which each respective dual FIFO functions to provide data into the integrated circuit array 105 in a predetermined sequence or order and collect the data from the integrated circuit array 105 in the same predetermined sequence or order.

Additionally, the integrated circuit 100 preferably includes main memory 160 comprising a single unified memory. The main memory 160 preferably functions to store data originating from one or more sensors, system-derived or generated data, data from one or more integrated circuit layers, data from one or more upstream devices or components, and the like. Preferably, the main memory 160 comprises on-chip static random-access memory or the like.

Additionally, or alternatively, main memory 160 may include multiple levels of on-die (on-chip) memory. In such embodiments, the main memory 160 may include multiple memory (e.g., SRAM) elements that may be in electrical communication with each other and function as a single unified memory that is arranged on a same die as the integrated circuit array 105.

Additionally, or alternatively, main memory 160 may include multiple levels of off-die (off-chip) memory (not shown). In such embodiments, the main memory 160 may include multiple memory (e.g., DDR SRAM, high bandwidth memory (HBM), etc.) elements that may be in electrical communication with each other and function as a single unified memory that is arranged on a separate die than the integrated circuit array.

It shall be noted that in some embodiments, the integrated circuit 100 includes main memory 160 comprising memory arranged on-die and off-die. In such embodiments, the on-die and the off-die memory of the main memory 160 may function as a single unified memory accessible to the on-die components of the integrated circuit 100.

Each of the first periphery memory 147 and the second periphery memory 157 may port into the main memory 160. Between the first periphery memory 147 and the main memory 160 may be arranged a load store unit that enables the first periphery memory 147 to fetch data from the main memory 160. Similarly, between the second periphery memory 157 and the main memory 160 may be arranged a second load store unit that enables the second periphery memory 157 to fetch data from the main memory 160.

It shall be noted that the data transfers along the memory hierarchy of the integrated circuit 100 occurring between dual FIFOs 149, 159 and the load stores 145, 155, between the load stores 145, 155 and the periphery memory 147, 157, and the periphery memory 147, 157 and the main memory 160 may preferably be implemented as prescheduled or predetermined direct memory access (DMA) transfers that enable the memory elements and load stores to independently access and transfer data within the memory hierarchy without direct invention of the dispatcher 130 or some main processing circuit. Additionally, the data transfers within the memory hierarchy of the integrated circuit 100 may be implemented as 2D DMA transfers having two counts and two strides thereby allowing for efficient data access and data reshaping during transfers. In a preferred embodiment, the DMA data transfers may be triggered by a status or operation of one or more of the plurality of array cores 110. For instance, if an array core is completing or has completed a processing of first set of data, the completion or near-completion may trigger the DMA transfers to enable additional data to enter the integrated circuit array 105 for processing.

III. Method for Core-Level Predication

As shown in FIG. 4, a method 400 for implementing core-level predication within an integrated circuit includes configuring a predicate stack for distinct processing cores of an integrated circuit array S410, setting a controlling bit S420, implementing a predicate stack at each of a plurality of distinct processing cores S430, and a re-enablement of processing cores S440. Additionally, S430 may include implementing a standard condition with a predicate stack S432, implementing a nested condition with a predicate stack S434, implementing a predicate stack and a loop body S436, one or more nested loops and a predicate stack S438.

It should be recognized that while each of S432, S434, S436, and S438 describe one or more distinct embodiments implementing a predicate stack, it may be possible in some embodiments of the present application to combine the one or more distinct embodiments of S432, S434, S436, and S438 such that the same predicate stack may be implemented in the combination of the distinct embodiments. For instance, the same predicate stack may be implemented with a standard condition, a nested condition, a loop, and a nested loop.

The method 400 preferably enables a granular control and/or manipulation of a plurality of distinct processing cores of an array of processing cores within an integrated circuit. In one or more embodiments of the present application, attributes of various data and/or applications being handled by the array of processing cores within the integrated circuit may inform or govern whether a given processing core should execute a set of instructions over other distinct sets of instructions to the given processing core. In one or more embodiments, each of a plurality of processing cores of an array of processing cores may simultaneously function to see all instructions to the array. In such embodiments, only a subset of the instructions to the array may be intended for a given processing core within the array. Thus, to identify whether some portion of the instructions should be processed by the given processing core, an evaluation of a predicate condition may be performed and a result of the evaluation (e.g., 1 or 0) may be pushed onto a predicate stack that may inform a decision by the given processing core to execute or not to execute a set of instructions that may be accessible to the given processing core.

Accordingly, one or more embodiments of the present application may enable a selectivity of between distinct sets of instructions based on an evaluation of a condition at a given processing core. In these circumstances, by setting or pushing one or more conditions to one or more processing cores of the integrated circuit, the one or more embodiments of the present application may function to ensure that a given processing core executes only those instructions that are intended for the given processing core and avoids executing invalid instructions or the like. Thus, in one or more embodiments of the present application, a result of a predicate condition pushed to a hardware stack within each of a plurality of processing cores within an array of processing cores of an integrated circuit (e.g., integrated circuit 100) may be set and/or may be controlled to allow each respective processing core within the array to decide which instructions of a plurality of instructions viewable by the respective processing core should be executed thereby improving an efficiency in computational performance of the integrated circuit and a quality of outputs of the integrated circuit.

4.1 Predication Default/Implementing a Core-Level Predicate Stack

S410, which includes configuring a predicate stack for distinct processing cores of an integrated circuit array, may function to configure a predicate stack at each of a plurality of distinct processing cores within an array of processing cores. That is, in one or more embodiments, each distinct processing core within an integrated circuit array may be specifically configured to have a predicate stack of registers having a predetermined depth or size (i.e., a predetermined number of registers arranged in an order or linear/sequential manner) and further configured with an initial setting at each (bit) entry along the predetermined depth. Additionally, or alternatively, the predicate stack of registers preferably may be arranged with logical connections and/or physical connections between them within each respective processing core.

In one or more embodiments, S410 may function to configure a size or depth of each predicate stack of the plurality of processing cores of a given array of processing cores. Preferably, each predicate stack includes an assemblage and/or stack of entries that may operate together to enable one or more computations and/or execution of instructions by an associated processing core. Each entry of the predicate stack of a given processing core may include a 1-bit hardware register, a single-bit entry, or any suitable memory capable of storing at least a single bit of data. Accordingly, the collection of 1-bit registers or the single-bit entries together define the predicate stack having a predetermined depth of the 1-bit registers or the single-bit entries. For instance, in a non-limiting example, S410 may function to configure a predicate stack with sixteen (16) 1-bit registers arranged in an ordered fashion, such as a linear arrangement or linear stack. It shall be noted that any suitable N-bit (where N may be the number of distinct bit entries) predicate stack may be implemented.

Additionally, or alternatively, S410 may function to configure an initial setting of each of the plurality of single-bit entries within each distinct predicate stack. For instance, S410 may function to bias and/or initialize the entries of predicate stack to an initial condition, such as ON or OFF, Active or Inactive, True or not True/False, 1 or 0 etc.

In a preferred embodiment, as a default, S410 may function to initialize the bit entries of each of the predicate stacks of an array of processing cores of a given integrated circuit to 1 or to some binary value or setting (e.g., ON, Execute, etc.) indicating that each of the plurality of processing cores may be available for selecting and processing a specific set of instructions. That is, in such preferred embodiment, S410 may function to bias or initialize each of the entries within each distinct predicate stack to a default value of 1 that together with an associated predicate condition at a top of the predicate stack informs an automatic selection a set of instructions that a processing core may automatically execute unless the condition evaluates to FALSE or not TRUE.

Alternatively, S410 may function to initialize at least a controlling bit entry (e.g., a top of stack) of the predicate stacks of each of a plurality of processing cores of an integrated circuit array to 0 bit entry value thereby requiring a satisfaction or an evaluation of a predicate condition to TRUE to change from the initialized value of 0 to a bit entry value of 1 that may be needed to select an execute select instructions. In yet other embodiments, S410 may additionally or alternatively function to differentiate in setting the initial bit entry values of the predicate stacks of the processing cores of a given integrated circuit array such that a subset of the predicate stacks may be initialized with a bit entry value of 1 and another subset of the predicate stacks may be initialized with a bit entry value of 0.

4.2 Setting a Controlling Bit

S420, which includes setting a controlling bit, may function to configure each predicate stack with a control bit or a controlling bit. A control bit as referred to herein preferably relates to a bit along a predicate stack, depending on its value, may function to control an operation of an entire predicate stack. That is, in some embodiments, a single control bit may be set or configured to a bit entry within a predicate stack that governs a selection between distinct sections of computer instructions to execute by an associated processing core. selects a first instruction over a second instruction or the like. For instance, a top of a predicate stack may be designated as a controlling bit such that a bit value at the top of stack may govern whether a first instruction or a second instruction pushed to the predicate stack is executed. Accordingly, a value of the controlling bit allows a given processing core to select and execute proper instructions. In a preferred embodiment, a bit value of the top of stack may be governed by an initialized setting and changed or maintained based on an evaluation of a predicate condition associated with the top of stack. For example, a value of a controlling bit at a top of stack may be 1 or 0 depending on an evaluation of a predicate condition to TRUE or FALSE.

Accordingly, in a preferred embodiment, S420 may function to configure or set a predicate stack with a top of stack controlling bit. That is, S420 may function to designate a single bit entry at a first position, a leading position, or a top position of a predicate stack as the bit entry value that governs whether the predicate stack and the associated processing core will execute one set of instructions over another depending on the value of the bit entry at the first position or the top position of the predicate stack. In a preferred implementation, instructions from an instruction source (e.g., a compiler, dispatcher, or the like) may push a computed result of a predicate condition to a predicate stack. The predicate condition, in such preferred implementation, may be a condition that can be validated or invalidated and preferably, includes a logical expression that evaluates to TRUE or FALSE for a typical purpose of directing an execution path in code or the like and in several embodiments of the present application, for governing an operation of a given processing core having the predicate stack.

Accordingly, in the preferred implementation, each of the processing cores may be configured with circuitry that may first function to evaluate a predicate condition and push a result of the evaluation to the predicate stack and that may function to inform a bit value at the top of the predicate stack. In the circumstance that it is determined, that the predicate condition at the top of stack is TRUE or satisfied, an initial bit entry value of 1 may be maintained at or added to the top of the predicate stack and a first instruction set may be selected over another instruction set for execution by the processing core. Conversely, in the circumstance that the predicate condition evaluates to FALSE or not TRUE, a bit entry value of 0 may be added to the top of the predicate stack and a selection of second set or different set of instructions for execution may be made by a given processing core.

4.3. Implementing a Predicate Stack

S430, which includes implementing a predicate stack at each of a plurality of distinct processing cores, may function to provide one or more instruction encodings that operate to push one or more of a result of a condition to a predicate stack and provide dedicated instructions to the predicate stack that affect a value of a top of stack bit entry of a predicate stack of a give processing core.

In a preferred implementation, S430 may function to designate a first instruction encoding (e.g., predstack or predpush) that may be used to push a result of a conditional clause onto a predicate stack. In such preferred implementation, any instruction may function to push a result of a condition onto a predicate stack by writing the condition to a designated result register or the like. For instance, in one non-limiting example, an instruction encoding such as predpush may be implemented to push a condition onto a predicate stack. In some embodiments, the push of a condition onto a predicate stack may itself be predicated by another condition.

In a preferred implementation, S430 may function to designate a second instruction encoding (e.g., predelse) that designates an ELSE clause in the circumstance that a condition to a predicate stack evaluates to FALSE or not TRUE. In one or more embodiments, an execution of a predelse instruction may cause a flip of a top of stack bit entry value. In one or more embodiments, if the predpush or predpush condition evaluates to FALSE, the top of stack bit entry value changes to 0 and an execution of a predelse instruction can flip the top of stack bit entry value from 0 to 1 which may allow a given processing core to automatically select and execute instructions within an ELSE clause rather than an IF clause. In one or more embodiments, a plurality of the second instruction encodings may be pushed by instructions to a predicate stack and in such circumstances, each distinct instruction having the second instruction encoding may be specific depth of the stack, an N depth location, where N indicates a stack depth for which the instructions according to the second encoding corresponds to (e.g., predelse 2, predelse 4, etc.).

In a preferred implementation, S430 may function to designate a third instruction encoding (e.g., predpop) that may be used to change or in some instances, maintain a bit entry value of a top of stack controller or top of stack bit entry. In such preferred embodiment, the third instruction encoding may function to pop the top of stack bit entry value from a current bit value to a bit value of the bit entry immediately following or below the top of stack. For example, if a bit entry value at a top of a predicate stack is 0, a predpop instruction (e.g., predpop 1) may function to pop the bit entry value of 0 from the predicate stack thereby allowing the bit entry value (e.g., 1) below a current top of stack to be a new top of stack value. Since all bit entries of a predicate stack are typically initialized to 1s, in one or more embodiments, a predpop allows the top of stack to return to a bit entry value of 1 if it is the only entry remaining on the stack.

Preferably, the third instruction encoding comprising predpop or the like may be applied at an end or a termination of an instruction clause (e.g., at an end of an if/else clause or the like) thereby allowing a top of a predicate stack to take on a value of a bit entry that follows the top of stack, which may be popped from the predicate stack. Accordingly, it shall be assumed herein that the third instruction encoding for popping the top of stack of a predicate stack may be applied in all instances following a completion of an instruction or other variant implementations of the predicate stack described in more detail below.

4.3.1 Condition-Based Predication|Standard IF Construct

Figure 5:
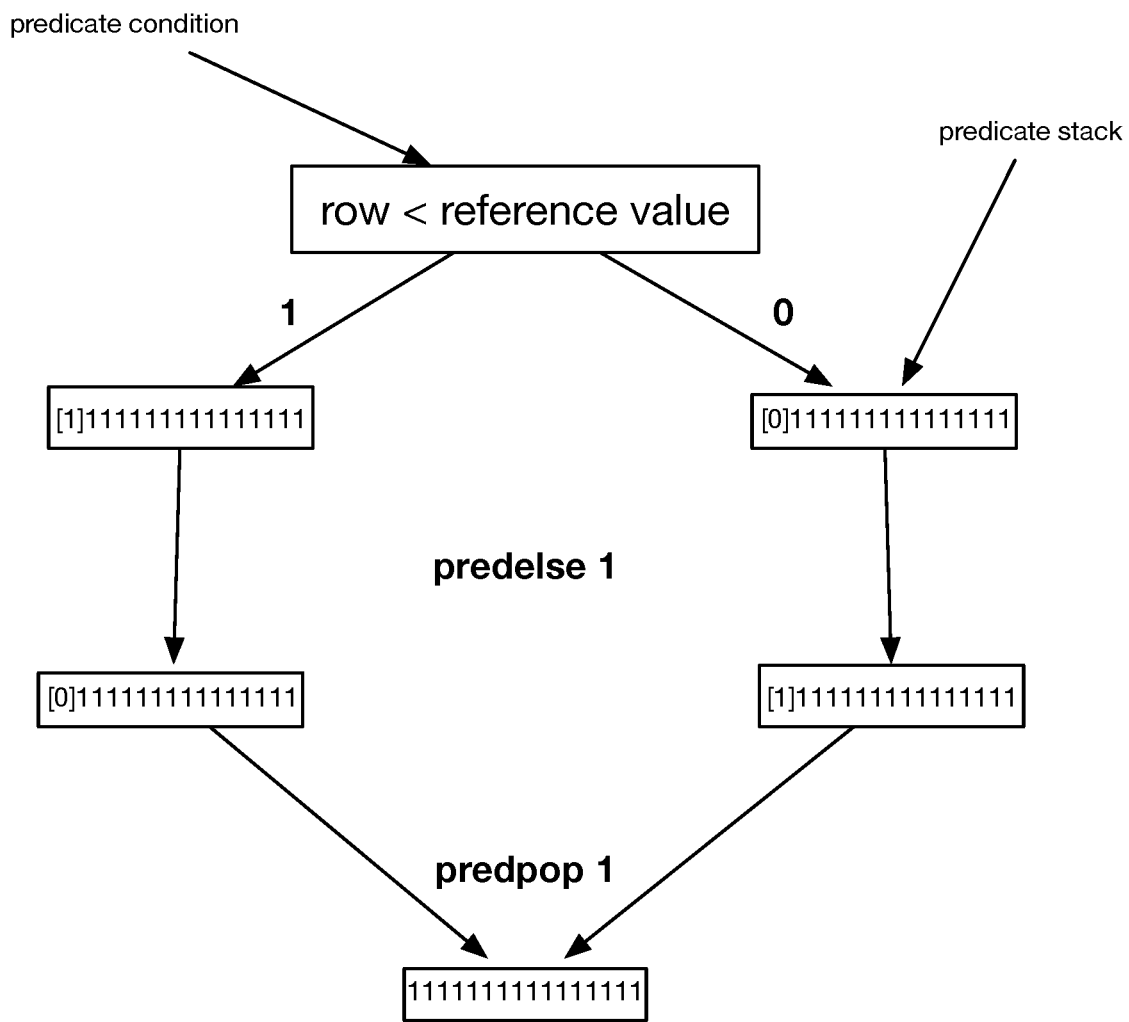
FIG. 5 illustrates a schematic of a predicate stack having a non-nested condition in accordance with one or more embodiments of the present application.

S432, which includes implementing a predicate stack having a standard condition (e.g., if-then statement or the like), may function to implement a predicate stack of a given processing core having a single conditional clause (e.g., an IF clause), as shown by way of example in FIG. 5. In one embodiment, implementing the predicate stack includes pushing a result of a predicate condition to a proper result register (e.g., cmplt row, 4, predstack or the like).

Preferably, at runtime and upon receiving an input data set or computer instructions at a given processing core, S432 may function to evaluate the predicate condition of the predicate stack to determine whether a given set of instructions will be executed and/or a given set of data will be processed at the given processing core having the predicate stack. Using circuitry at the given processing core, S432 may function to implement the evaluation of the predicate condition to determine whether the predicate condition evaluates to TRUE or FALSE (not TRUE). If the predicate condition evaluates to TRUE, S432 may function to maintain a top of stack value of 1 and continue to execute one or more instructions pushed to the predicate stack of the given processing core. Alternatively, if the predicate condition evaluates to FALSE, S432 may function to change or flip the top of stack value from 1 to 0 and if no ELSE clause exists, the given processing core may function to bypass the IF instructions.

Additionally, or alternatively, if the predicate condition evaluates to FALSE and the top of controller condition is set to 0, S432 may function to push a further instruction (e.g., predpop) preferably at an end of an instruction set that functions to pop the top of stack to remove the existing bit entry value of 0 at the top of the predicate stack and allow for a new top of stack value, preferably 1, to be the top of stack value. In one example, if a bit entry value at the top of stack is 0 and a bit entry value below the top of stack is 1, a predpop instruction or similar instruction may function to pop the top of the stack thereby causing a bit entry value (i.e., 1) below a current top of stack of 0 to become the new top of stack value. That is, the top of stack value is replaced with or takes on a bit value of a bit entry that may be immediately below the top of stack. In a preferred embodiment, since all bit entry values of a predicate stack may be initialized to 1s with only a bit value of the top of stack changing depending on an evaluation of a predicate condition, a predpop instruction or similar instruction would function to pop the top of stack to a value of 1 since the bit entry values below the top of stack may all typically be initialized to 1s.

4.3.1 Nested Condition-Based Predication|IF/ELSE Condition Construct

Figure 6:
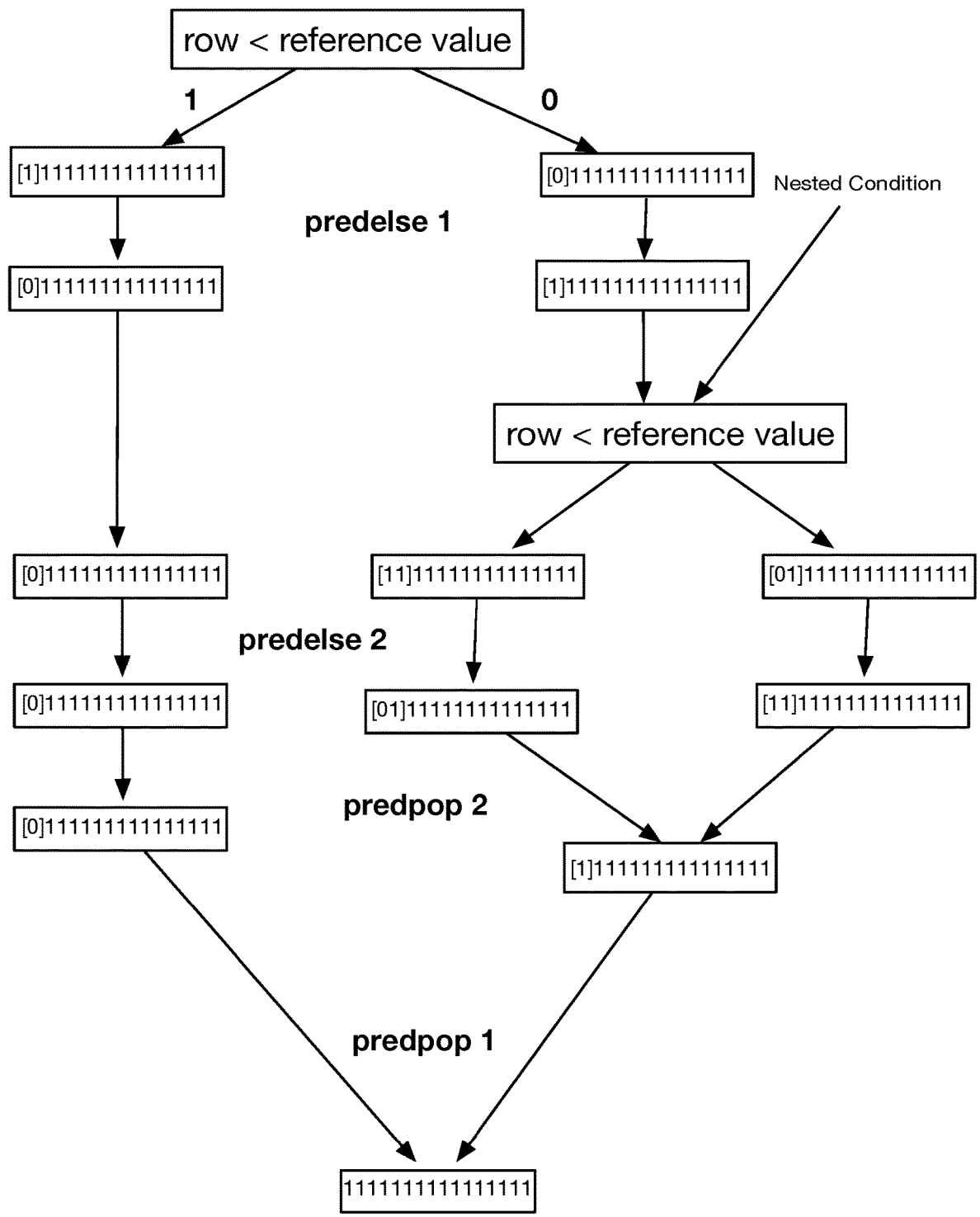
FIG. 6 illustrates a schematic of a predicate stack having nested condition in accordance with one or more embodiments of the present application.

S434, which includes implementing a nested condition predicate stack, may function to implement a predicate stack of a given processing core having multiple conditions, as shown by way of example in FIG. 6. For example, a nested condition may include an instruction set in which a second conditional clause may exist within a body of or embedded within a first conditional clause and so forth.

It shall be known that one or more conditions may be nested within any type or any suitable instructional construct. For instance, a primary or outer IF clause may include one or more nested or inner IF conditional clauses. Similarly, in some instances, an outer ELSE clause may include one or more nested inner IF conditional clauses. Additionally, or alternatively, nested IF conditional clauses may be nested into both IF or ELSE clauses.

In one implementation, an IF conditional clause may be nested within an outer ELSE clause or the like of a predicate stack. In such implementation, an execution of an ELSE clause may enable a subsequent opportunity to evaluate the nested IF conditional clause along the depth of the stack. That is, in such example implementation, when an initial and/or primary predicate stack IF condition of an IF/ELSE clause evaluates to FALSE, the ELSE clause may be executed that may eventually allow for an evaluation of the nested IF condition within a depth of the stack.

It shall be noted that if an outer IF predicate condition evaluates to FALSE and a subsequent evaluation to TRUE of a nested or inner predicate condition may not function to flip or change a top of stack value for the outer IF condition. Similarly, if a predelse statement of a nested condition operates to flip a top of stack of a predicate stack of the nest condition from 0 to 1, the effect of the predelse statement of the nested condition may not function to affect a top of stack value of an outer IF clause. In such embodiments, S434 may function to implement a restrictive logic that limits an effect of a nested predelse (ELSE clause) or the like onto an outer condition or onto conditions at depths prior to a depth of the nested predelse statement. Accordingly, in one or more embodiments, a predelse statement or instruction may typically include an N depth value indicating where within a depth of stack should the effects of an execution of the predelse should apply. For instance, an effect of an execution of a predelse 3 statement should apply against a predicate stack associated with an IF conditional clause that two depths below an outer IF conditional clause (e.g., IF→if (2)→if (3)).

In one non-limiting implementation, implementing the nested condition predicate stack may include pushing an outer predicate stack condition (e.g., IF clause) to a proper result register (e.g., cmplti row, 4, predstack // if (row<4)) that includes a nested predicate condition (e.g., cmplti col, 2, predstack // if (col>2) clause to a proper result register that may be evaluated to TRUE or FALSE.

Additionally, and similar to an identification of an N depth value for a predelse instruction (i.e., a predicate ELSE clause), S432 may function to push a further a predicate pop instruction (e.g., predpop) preferably at an end of each of an outer conditional instructions and the nested conditional instructions that each respectfully function to pop the top of stack of their respective predicate stacks. In such example implementation, since the outer conditional clause may be found at the outermost depth (i.e., the first depth) of the instruction stack, the outer conditional clause may be associated with an N depth of 1 and thus, the predpop instruction may be directed to the N depth of 1 (i.e., predpop 1).

Additionally, since the inner/nested conditional clause may be found at a second depth of the instruction stack, the predpop instruction to pop the predicate stack of the nested condition may be directed to an N depth of 2 (i.e., predpop 2).

4.3.2 Loop Body Implemented with a Predicate Stack

S436, which includes implementing a predicate stack and a loop body, may function to implement the predicate stack in conjunction with a loop body and provide dedicated instructions for affecting an exit or breaking from the loop body. In such embodiments, the predicate stack may be implemented in parallel or orthogonally to the loop body. S436 may additionally or alternatively provide a dedicated disable instruction that may be triggered by an evaluation of a conditional loop break that may function to allow a given processing core to exit the loop body based on a manipulation of a bit value of an enable bit.

In a preferred embodiment, S436 may function to implement an enable bit for each distinct processing core of the plurality of processing cores of an integrated circuit array. An enable bit preferably functions as a global bit that operates outside of the predicate stack and that controls and ON/OFF state of a given processing core. In one or more embodiments, the enable bit is preferably initialized to a bit entry value of 1 indicating that an associated processing core should be enabled (i.e., ACTIVE or ON). In such embodiments, a conditional loop break that if evaluated to TRUE causes an execution of a dedicated disable instruction that may function to change a value of the enable bit from 1 to 0 thereby disabling an associated processing core and stopping a loop.

In some embodiments, a predicated loop break (e.g., cmpgtei cr4, predstack // if (I>=2) then break), if evaluated to TRUE, may trigger an execution of a disable instruction. In such an example, the disable instructions operates to stop a given processing core from processing instructions of a loop body when or if a comparison or the like of the conditional loop break evaluates to FALSE. In such preferred embodiment, the loop break or the disable instructions may include a predicate conditional loop break (e.g., predstack // if (i>=2) then break) that if evaluated to TRUE causes an execution of a disable instruction. In a preferred embodiment, the predicated loop break may be injected directly into the predicate stack by a compiler. That is, rather than a condition pushed to the predicate stack (i.e., from a dispatcher or the like), S436 may function to cause the compiler to force the conditional loop break with a dedicated disable instruction.

In the circumstance that a disable function may be executed by a given processing core, the given processing core may maintain a disabled state (i.e., OFF state) until the given processing core is re-enabled. In some embodiments, S436 may function to re-enable the given processing core with a dedicated enable instruction at end or after a completion of a loop that flips a bit entry value of an enable bit from 0 (i.e., OFF) to 1 (i.e., ON) and that reverts the given processing core back to an ON state from an OFF state following the predicated loop break and execution of the disable instruction. Preferably, the enable instructions may be provided directly from a compiler to re-enable the stopped processing core. Additionally, or alternatively, if or when a conditional loop break evaluates to TRUE, S436 may function to provide the dedicated disable instruction paired with a corresponding enable instruction. In this way, while the disable instruction may operate to stop a loop and turn off a given processing core, the corresponding enable instruction may function to ensure that the given processing core does not remain in an OFF state and may be re-enabled to an ON state.

Accordingly, in such embodiments, enable instructions may be found floating outside of the loop body and directed to the processing core by the compiler for re-enablement of the processing core. In a variant of such embodiments involving one or more nest loops, the dedicated enable instructions may be found inside of the loop body of the nested loop and may be executed based on an evaluation of a condition clause or the like.

Additionally, or alternatively, S436 may function to provide a dedicated a conditional loop continue that if evaluated to TRUE causes an execution of an idling instruction that pauses an execution of a remainder of instructions of a current iteration of a loop body by a given processing core and that idles the given processing core. That is, in such embodiments, a loop continue may cause the given processing core not to execute some amount of or remaining instruction sets in a current iteration of the loop, but may allow the given processing core to start processing instructions of the loop again on the next iteration of the loop.

Additionally, or alternatively, in one embodiment, S436 may function to execute an enable instruction at an end of the instructions of the loop body, which causes at a subsequent iteration of the loop body, a re-enablement of the given processing core based on the execution of the enable instruction and the continued execution of instructions of a subsequent iteration of the loop body.

4.3.3 Nested Loops Implemented with a Predicate Stack

S438, which includes implementing one or more nested loops with a predicate stack, may function to implement a predicate stack and one or more loops nested within an outer loop body and provide a conditional loop break and disable instructions directed to distinct N depth of the stack for exiting the one or more nested loops.

In one or more embodiments, the method 400 may function to implement S438 in a similar manner as S436 in that a dedicated disable instruction may be injected to a given processing core that disables or stops the processing core thereby allowing the given processing core to exit from a loop. Similar to S436, S438 may similarly inject an enable instruction or a re-enable instruction to the given processing core that may function to flip a value of an enable bit to 1 and that may turn the given processing core back to an ON state or otherwise, allows the given processing core to perform execution of code.

Since the one or more loops may be nested within one or more depths of a loop body, S438 may additionally enable a tracking of a depth of each of the one or more nested loops within the loop body. In one implementation, S438 may function to implement a nested loop counter or loop depth counter that counts each nested loop and its depth or position within the loop body and attributes a distinct counter value as a depth of a respective nested loop within the loop body. For instance, if a first outer loop may be counted as being at a depth of 1, a first nested loop may be counted as being at a depth of 2, and a second nested loop may be counted as being at a depth of 3 and so on.

Accordingly, if a given processing core desires to break from a specific one of the nested loops executing on the given processing core, S438 may function to cause the compiler or the like to provide a dedicated disable instruction to the processing core that stops the processing core from executing instructions within the loop body. In a preferred embodiment, S438 may additionally or alternatively implement a counter that keeps track of a nesting level or depth of each nested loop. In this way, the proper nested loop at the associated N depth of a loop body or the like may be known and enable instructions may be directed to the level of the nested loop. That is, an enable instruction, in such embodiments, must have a count associated with it that matches a value of a counter that is tracking a nesting level of a specific nested loop. In one non-limiting example, if a loop depth of the specific nested loop that a given processing core desires to exit is 2, S438 may function to direct an enable instruction (e.g., enable 2 or the like) to a loop having a depth of 2 or level 2 of the nested loop body, which may indicate that the nested loop is at least one level down from an outer loop. Additionally, or alternatively, the loop depth N value may be used for specifically directing other instructions, such as predelse or predpop towards specific nested loops and the like.

4.4 Failsafe|Re-enablement of Cores

Optionally, or additionally, S440, which includes implementing a global re-enablement of processing cores, may function to provide a global enable instruction to a plurality of processing cores within an array of processing cores. In one or more embodiments, if a plurality of processing cores may be disabled or otherwise, may be maintaining a stopped condition, S240 may function to propagate a global enable instruction to all processing cores of the array.

In some embodiments, the global enable instruction to all processing cores of an array may be a failsafe (e.g., a failsafe to 1 bit entry or an ON condition). In such embodiments, if it is determined by S440 that an amount (e.g., a majority) or all processing cores of a given array have been disabled for or beyond a failsafe threshold (e.g., a maximum amount of time), S440 may automatically cause an execution of enable instruction at each of the plurality of processing cores within an array of processing cores. In such embodiments, the enable instruction may function to ensure that each distinct enable bit associated with each distinct processing core may have a bit entry value of 1 thereby ensuring that the processing cores are in an ON state.

In some embodiments, S440 may function to propagate a status of each processing core of a plurality of processing cores to a dispatcher that identifies whether an all stop or a majority stop of the plurality of processing cores has occurred.

In one example, if a majority or all processing cores of an array of processing cores desiring to exit one or more loops, which upon exiting the loops caused a disablement or a stoppage of the processing cores, S440 implementing a dispatcher may function to force a skip to the end of the loops bypassing all instructions associated with each of the one or more loops and execute an enable instruction that causes bit entry values of the enables bits to flip from 0s to 1s allowing the stopped processing cores to re-enable to an ON state.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A system for implementing an integrated circuit with core-level predication, the system comprising:
 a plurality of processing cores of an integrated circuit, wherein each of the plurality of cores includes:
  (i) a predicate stack defined by a plurality of single-bit registers that operate together based on one or more of logical connections and physical connections of the plurality of single-bit registers,
  wherein:
   the predicate stack of each of the plurality of processing cores includes a top of stack single-bit register of the plurality of single-bit registers having a bit entry value that controls whether select instructions to the given processing core of the plurality of processing cores are executed; and
  (ii) an enable bit that operates outside of the predicate stack and that controls an ON/OFF state of a given processing core of the plurality of processing cores,
  wherein:
   a conditional loop break if evaluated to TRUE causes an execution of a disable instruction that:
    (a) stops the execution of the instructions of a loop body by the given processing core,
    (b) changes a value of the enable bit, and
    (c) disables the given processing core and changes the given processing core from an ON state to an OFF state,
   the execution of the disable instruction changes a bit entry value of the enable bit of the given processing core from 1 to 0 or 0 to 1 according to a binary system, and
   a subsequent execution of an enable instruction that is paired with the disable instruction causes a re-enablement of the given processing core and changes the bit entry value of the enable bit.

2. The system according to claim 1, wherein:
 instructions push a result of a conditional clause onto the predicate stack of the given processing core of the plurality of processing cores;
 if the conditional clause evaluates to TRUE, based on a comparison of distinct values of the conditional clause, the given processing core executes an instruction of the conditional clause.

3. The system according to claim 1, wherein:
 instructions push a result of a conditional clause onto the predicate stack of the given processing core of the plurality of processing cores;
 if the conditional clause evaluates to FALSE, based on a comparison of distinct values of the conditional clause, the given processing core bypasses an instruction of the conditional clause and selectively executes or not a distinct instruction clause.

4. The system according to claim 1, wherein:
each of the plurality of single-bit registers of the predicate stack is initialized to a value of 1;
if the conditional clause evaluates to FALSE, based on a comparison of distinct values of the conditional clause, a bit entry value of 0 is pushed to a top of the predicate stack.

5. The system according to claim 4, wherein:
the given processing core selects to execute instructions of a predicated ELSE clause over instructions of an IF clause of the conditional clause based on the bit entry value of the top of the predicate stack being pushed to 0.

6. The system according to claim 1, wherein:
if the conditional clause evaluates to FALSE, based on a comparison of distinct values of data of the conditional clause:
  (i) a bit entry value of a top of the predicate stack of a given processing core of the plurality of processing cores is pushed to 0; and
  (ii) the given processing core selects to execute instructions of an alternative instruction over instructions of an IF clause of the conditional clause, wherein an execution of the alternative instructions flips the bit entry value of the top of the predicate stack from 0 to 1.

7. The system according to claim 1, wherein:
in response to executing or not executing the select instructions at the given processing core, executing by the given processing core a predicated pop instruction that pops the bit entry value from the top of the predicate stack and exposes a bit entry value of a bit entry that was previously below the top of stack.

8. The system according to claim 1, wherein
instructions pushing a result of a conditional clause onto the predicate stack of the given processing core include a nested conditional clause;
a counter of the given processing core tracks a depth of the nested conditional clause within a body of the instructions; and
instructions affecting a predicate stack of the nested conditional clause include a value of the counter associated with the depth of the nested conditional clause.

9. The system according to claim 1, wherein:
the given processing core executes instructions of a nested loop body;
a counter of the given processing core tracks a depth of the nested loop body; and
instructions affecting the nested loop body include a value of the counter associated with the depth of the nested loop body.

10. The system according to claim 9, wherein:
the conditional loop break having the value of the counter tracking the depth of nested loop body, if evaluated to TRUE causes the execution of the disable instruction that stops an execution of the instructions of the nested loop body by the given processing core and that disables the given processing core.

11. The system according to claim 10, wherein:
a subsequent execution of the enable instruction having the value of the counter tracking the depth of nested loop body paired with the disable instruction causes the re-enablement of the given processing core.

12. The system according to claim 1, wherein:
the given processing cores executes instructions of the loop body;
a conditional loop continue if evaluated to TRUE causes an execution of an idling instruction that pauses an execution of a remainder of instructions of a current iteration of the loop body by the given processing core and that idles the given processing core.

13. The system according to claim 1, wherein:
executing the enable instruction at an end of instructions within the loop body;
at a subsequent iteration of the loop body, re-enabling the given processing core based on the execution of the enable instruction and executing instructions of the subsequent iteration of the loop body.

14. The system according to claim 1, wherein:
if it is determined that a subset or all the plurality of processing cores are in a disabled state, a dispatcher forces a skip to an end of instructions at the subset or all the plurality of processing cores and executes an enable instruction that changes a value of an enable bit from 0 to 1 or 1 to 0 to enable the subset or all the plurality of processing cores.

15. A method for implementing an integrated circuit with core-level predication, the method comprising:
implementing a plurality of processing cores of an integrated circuit, wherein each of the plurality of cores includes:
  (i) a predicate stack defined by a plurality of single-bit registers that operate together based on one or more of logical connections and physical connections of the plurality of single-bit registers,
  wherein:
    the predicate stack of each of the plurality of processing cores includes a top of stack single-bit register of the plurality of single-bit registers having a bit entry value that controls whether select instructions to the given processing core of the plurality of processing cores are executed; and
  (ii) an enable bit that operates outside of the predicate stack and that controls an ON/OFF state of a given processing core of the plurality of processing cores,
  wherein:
    a conditional loop break if evaluated to TRUE causes an execution of a disable instruction that:
      (a) stops the execution of the instructions of a loop body by the given processing core,
      (b) changes a value of the enable bit, and
      (c) disables the given processing core and changes the given processing core from an ON state to an OFF state,
    the execution of the disable instruction changes a bit entry value of the enable bit of the given processing core from 1 to 0 or 0 to 1 according to a binary system, and
    a subsequent execution of an enable instruction that is paired with the disable instruction causes a re-enablement of the given processing core and changes the bit entry value of the enable bit.

16. The method according to claim 15, further comprising:
pushing a result of a conditional clause onto the predicate stack of the given processing core of the plurality of processing cores;
if the conditional clause evaluates to TRUE, based on a comparison of distinct values of the conditional clause, executing by the given processing core an instruction of the conditional clause.

17. The method according to claim 15, further comprising:

pushing a result of a conditional clause onto the predicate stack of the given processing core of the plurality of processing cores;

if the conditional clause evaluates to FALSE, based on a comparison of distinct values of the conditional clause, bypassing by the given processing core an instruction of the conditional clause and selectively executing or not a distinct instruction clause.

18. The method according to claim 15, further comprising:

initializing each of the plurality of single-bit registers of the predicate stack to a value of 1;

if the conditional clause evaluates to FALSE, based on a comparison of distinct values of the conditional clause, pushing a bit entry value of 0 onto of a top of the predicate stack of the given processing core of the plurality of processing cores.

* * * * *